Feb. 24, 1959  H. HAUSER  2,874,581
INFINITELY VARIABLE GEARS
Filed Jan. 30, 1956

INVENTOR
Helmut Hauser
BY Ernest Montague
ATTORNEY

United States Patent Office 2,874,581
Patented Feb. 24, 1959

2,874,581
INFINITELY VARIABLE GEARS
Helmut Hauser, Hochst, Vorarlberg, Austria
Application January 30, 1956, Serial No. 562,316
3 Claims. (Cl. 74—143)

The present invention relates to an infinitely variable gear for transforming reciprocating driving forces into a rotary movement, using unidirectionally acting ratchet mechanisms.

It is one object of the present invention to provide an infinitely variable gear which is distinguished from known gears of the same type by a simple construction and highest efficiency.

It is another object of the present invention to provide an infinitely variable gear which comprises at least two alternatingly driving elements movable in the same direction, e. g. the piston rods of two pistons of an internal-combustion engine drive a rocker arm, which has connected thereto by a pivot two rocker levers whose joint axis is radially outwardly adjustable, e. g., along a guide slot, from a position in which it is coaxial with the pivot of the rocker arm, and each of the two rocker levers has associated therewith a ratchet mechanism, which ratchet mechanisms act in mutually opposite directions and serve to transmit mutually opposite drive motions from said rocker levers to two wheels, which drive the output shaft by means of a wheel connecting said two wheels. To enable an infinite variation of the transmission ratio during operation, the ratchet-driven pair of wheels is mounted on a carriage or the like, which can be deliberately shifted at right angles to the axis of the rocker arm. The rocker levers themselves are preferably used to provide for a speed change in that they have a long arm pivoted to the rocker arm and a short arm carrying the friction face.

Figure 1:
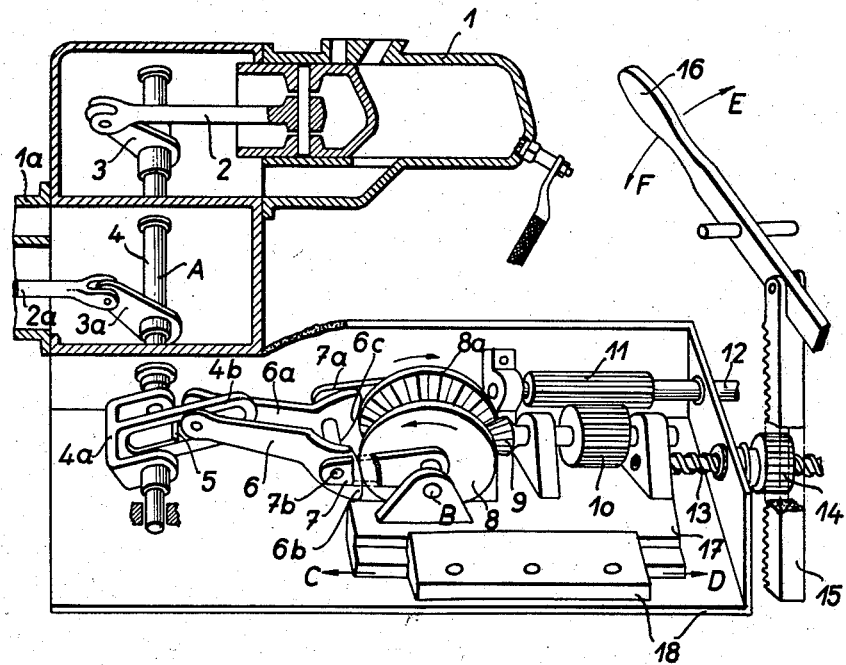
Figure 2:
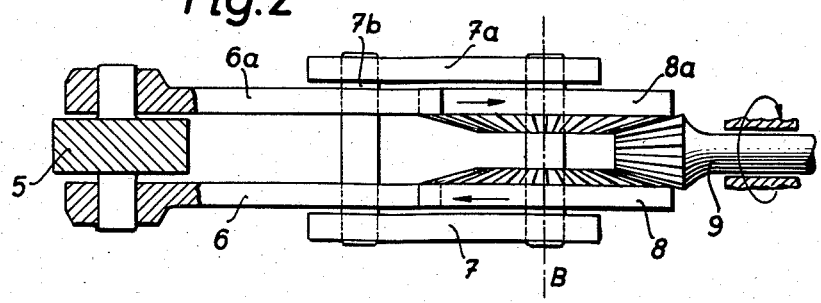

With these and other objects in view which will become apparent in the following detailed description, the present invention will be clearly understood in connection with the accompanying drawing, in which:

Figure 1 is a diagrammatic perspective view of an internal-combustion engine, whose casing is shown in section, with a speed change gear connected thereto; and Fig. 2 shows a detail thereof in an orthogonal projection, partly in section.

Referring now to the drawing, the drive motor has two pistons moving in corresponding cylinders 1 and 1a and transmitting an oscillatory rather than a rotary motion to the shaft 4 by means of the connecting rods 2, 2a and the cranks 3, 3a. The shaft 4 carries a crank 4a, which has a projecting centrally slotted arm 4b, the slot of which serves as guide for a sliding block 5. The latter has pivoted thereto the longer arms of the two rocker levers 6, 6a, which are pivoted by means of the shaft 7b to carrying arms 7 and 7a and have each a short arm carrying oppositely inclined friction faces 6b and 6c, which consist of hard steel or have a hard-alloy facing. During the oscillation of the levers these friction faces cooperate in the manner of a friction ratchet with the peripheral surfaces of crown wheels 8 and 8a provided with bevel teeth and driving a bevel pinion 9, which drives by means of a spur gear 10 a toothed roll 11 on the output shaft 12.

The elements 7—10 are mounted on a baseplate 17, which is longitudinally slidably carried on the casing 18 for movement in the direction C—D. The longitudinal movement of the baseplate 17 is effected by a coarse-threaded spindle 13, which engages a female thread in the baseplate 17 and which can be rotated by means of a pinion 14 and a rack 15 by a hand lever 16 pivotally movable in the direction E—F.

The mode of operation is as follows:

The oscillation of the crankshaft 4 causes an oscillation of the slotted arm 4b and of the rocker levers 6, 6a, which engage the crown wheels 8 and 8a alternatingly in the manner of a friction ratchet to impart mutually opposite movements alternatingly to said wheels. These movements will be added up by the bevel pinion 9 to impart a unidirectional drive to the output shaft 12.

The transmission ratio may be varied between idling and a minimum by a change of the distance of the axis A of the crankshaft 4 from the axis B of the crown wheels 8, 8a by operation of the hand lever 16. Idling will be achieved when the pivots of the block 5 coincide with the crankshaft axis A because in that case no movement will be transmitted to the rocker levers 6, 6a. The transmission ratio will be gradually and continuously decreased by an increase of the distance A—B until the block 5 has assumed its outermost position in the slot of the arm 4b. In all positions of the block 5 outside the idling position the rocker levers 6, 6a will perform a reciprocating movement, which increases in magnitude as the block 5 is moved outwardly. The oscillatory movement is stepped down by the rocker levers 6, 6a because they have arms of different length. By the engagement of the hard-steel faced friction faces 6b and 6c acting like the friction bodies of a freewheel drive that movement is transmitted alternatingly to the crown wheels 8 and 8a, each of which is driven in one direction only, and from there to the output shaft 12.

While I have disclosed one embodiment of the present invention, it is to be understood that this embodiment is given by example only and not in a limiting sense, the scope of the present invention being determined by the objects and the claims.

I claim:

1. The combination of a power actuated rocking shaft, a crank secured to said shaft and carrying a rocking arm extending in opposite directions from the axis of said shaft, a sliding block mounted for longitudinal movement in said arm, one of the axes of said sliding block being disposed parallel to said shaft axis, in order to permit a coinciding position of said one of the axes of said block with said axis of said shaft, two rocker levers pivotally secured to said sliding block, a pair of gears rotatably mounted in planes extending through said rocker levers, means for turning alternately said gears in opposite directions in response to simultaneous rocking movement of said levers upon rocking said shaft, a pinion gear meshing with both said gears and driven alternately by the latter, an output shaft operatively connected with said pinion gear, and means for varying the distance between the axis of said pair of gears and the axis of said rocking shaft.

2. A gear as set forth in claim 1, in which said rocker arm is formed with a slot which extends radially outwardly from said shaft axis and along which said block is radially adjustable.

3. A gear as set forth in claim 1, in which each of said rocker levers has a long arm pivoted to said rocker arm and a short lever arm, and said means for turning alternately said gears in opposite directions comprises ratchet mechanisms and each of said ratchet mechanisms comprises a friction face formed on one of said short lever arms.

References Cited in the file of this patent

UNITED STATES PATENTS

| | | |
|---|---|---|
| 1,175,138 | Drake | Mar. 14, 1916 |
| 1,385,083 | McCulley | July 19, 1921 |
| 1,813,614 | Franks | July 7, 1931 |